US008121187B2

(12) United States Patent
McGowan et al.

(10) Patent No.: US 8,121,187 B2
(45) Date of Patent: Feb. 21, 2012

(54) METHOD AND APPARATUS FOR PERFORMING MULTIPLE BIT RATE VIDEO ENCODING AND VIDEO STREAM SWITCHING

(75) Inventors: James William McGowan, Flemington, NJ (US); Ajay Rajkumar, Morristown, NJ (US)

(73) Assignee: Alcatel Lucent, Paris (FR)

( * ) Notice: Subject to any disclaimer, the term of this patent is extended or adjusted under 35 U.S.C. 154(b) by 1111 days.

(21) Appl. No.: 11/999,361

(22) Filed: Dec. 5, 2007

(65) Prior Publication Data

US 2009/0147859 A1   Jun. 11, 2009

(51) Int. Cl.
  *H04B 1/66*   (2006.01)
(52) U.S. Cl. .................................. 375/240.01
(58) Field of Classification Search .......... None
  See application file for complete search history.

(56) References Cited

U.S. PATENT DOCUMENTS

| 2002/0118295 | A1 | 8/2002 | Karczewicz et al. | 348/384.1 |
| 2004/0093618 | A1 | 5/2004 | Baldwin et al. | 725/101 |
| 2007/0174880 | A1 | 7/2007 | Fite et al. | 725/87 |

FOREIGN PATENT DOCUMENTS

| EP | 1 796 394 A2 | 6/2007 |
| WO | WO 2004/114668 A1 | 12/2004 |
| WO | WO 2006/016950 A1 | 2/2006 |

OTHER PUBLICATIONS

PCT International Search Report dated Jun. 2, 2009 (PCT/US2008/013058) 4 pages.
U.S. Appl. No. 11/978,817, filed Oct. 30, 2007, Mauricio Cortes, et al.

*Primary Examiner* — Kevin C Harper
(74) *Attorney, Agent, or Firm* — Harness, Dickey & Pierce, P.L.C.

(57) ABSTRACT

A Multiple Bit Rate (MBR) video coding method and apparatus for performing video encodings at multiple bit rates and for performing advantageous switching therebetween. Frequent switching points and high video coding efficiency are achieved with use of a plurality of video encodings at each of a plurality of bit rates, wherein the switching points between multiple encodings at a given bit rate are shifted with respect to one another so that the frequency of available switching points is significantly improved without a corresponding loss of coding quality. In addition, one or more "high quality" encodings may be provided at each bit rate, wherein the "high quality" encodings employ infrequent switching points, providing a very high quality encoding at the given bit rate which may be used (or switched to) whenever possible.

24 Claims, 5 Drawing Sheets

US 8,121,187 B2

METHOD AND APPARATUS FOR PERFORMING MULTIPLE BIT RATE VIDEO ENCODING AND VIDEO STREAM SWITCHING

FIELD OF THE INVENTION

The present invention relates generally to the field of video coding and more particularly to a method and apparatus for performing video encoding at multiple bit rates and for performing advantageous switching between such multiple video encodings.

BACKGROUND OF THE INVENTION

Multiple bit rate (MBR) video encoding is a modern compression technique useful for delivering video over networks with time-varying bandwidth. MBR codecs (encoder/decoder systems) are used, for example, to provide video over the internet, and are also critical on mobile wireless networks in which the bandwidth available to a user changes dramatically over time. The 3GPP standards organization, for example, is adopting a MBR strategy as a standard for all High Speed Downlink Packet Access (HSDPA) terminals, and this strategy underlies the proprietary streaming formats from the leading vendors which provide streaming video. MBR video encoding techniques are useful because the bit rate of a video signal must be able to adapt to the changing network conditions while gracefully adjusting quality.

In particular, MBR video encoding techniques typically provide for such adaptability to the network conditions by creating a plurality of video sequences (or "copies"), each generated from the same video source material, and having a common set of switching points whereby a video system can switch between the copies. Thus, whenever network conditions change, the playback mechanism advantageously streams the copy that best matches the available bandwidth. Strategies for switching seamlessly between two or more of such video copies having different bit rates and common switching points are conventional and well known to those of ordinary skill in the art.

More specifically, in a typical MBR video system realization, several copies of the same video sequence are pre-encoded at different bit rates, and the playback system selects which video sequence to display from frame to frame. Only certain frames are valid "switching points" in which the decoder can start receiving a different stream and still recreate sensible video. However, since frames which are valid switching points must be encoded with use of far less efficient coding techniques than most other frames, there is an inherent tradeoff between the frequency of available of switching points and the overall efficiency of the multiple video encodings. (Typically, switching points must be encoded with use of a technique known as "intra-coding" rather than the technique of "inter-coding" used for most other frames. Each of these are fully familiar to those of ordinary skill in the art.) Frequent switching points are critical when the available bandwidth fluctuates rapidly (such as it does in wireless channels, for example), while the efficiency of a video encoding directly effects the overall video quality achievable at a given bit rate.

SUMMARY OF THE INVENTION

The instant inventors have recognized that it is possible to have the "best of both worlds" in that frequent switching points and high video coding efficiency may both be advantageously achieved in accordance with the principles of the present invention. In particular, in accordance with an illustrative embodiment of the present invention, a plurality of video encodings at each of a plurality of bit rates is provided, wherein the switching points between multiple encodings at a given bit rate are located at different frames thereof. In this way, when it becomes necessary or appropriate to switch to a given bit rate, a particular one of these plurality of video encodings at the given bit rate may be advantageously selected based on the location of its switching points (i.e., based on which of these encodings has an available switching point).

In accordance with one illustrative embodiment of the present invention, the multiple encodings at a given bit rate provide periodic switching points whose frame locations are advantageously shifted with respect to one another, so that the frequency of available switching points for the given bit rate is significantly more than (e.g., a multiplicative factor of) the frequency of switching points in any one of these encodings. Illustratively, if n encodings at a given bit rate are provided, available switching points for the given bit rate may be n times as frequent as the switching points available in any one individual encoding at that bit rate.

In accordance with another illustrative embodiment of the present invention, one or more "high quality" encodings are provided at a given bit rate, in addition to a plurality of other encodings at that bit rate, wherein the other encodings at that bit rate provide periodic switching points whose frame locations are advantageously shifted with respect to one another (illustratively as described above), but wherein the "high quality" encoding at that bit rate employs infrequent switching points (e.g., only as frequently as conventional encoding techniques may provide such frames without "forcing" the generation thereof). In this manner, a very high quality encoding is available at the given bit rate and may be used (or switched to) whenever possible.

DETAILED DESCRIPTION OF THE PREFERRED EMBODIMENTS

In current state-of-the-art MBR encoders, different types of switch-point frames (S) are aligned periodically in different copies of the video at different bit rates. Because of the low S-frame rate, this type of video is relatively efficiently encoded. However, when a bit rate change is requested (as will be shown by "up" and "down" arrows in the instant figures), the system will often have to wait many frames before the requested transition can occur.

Figure 1:
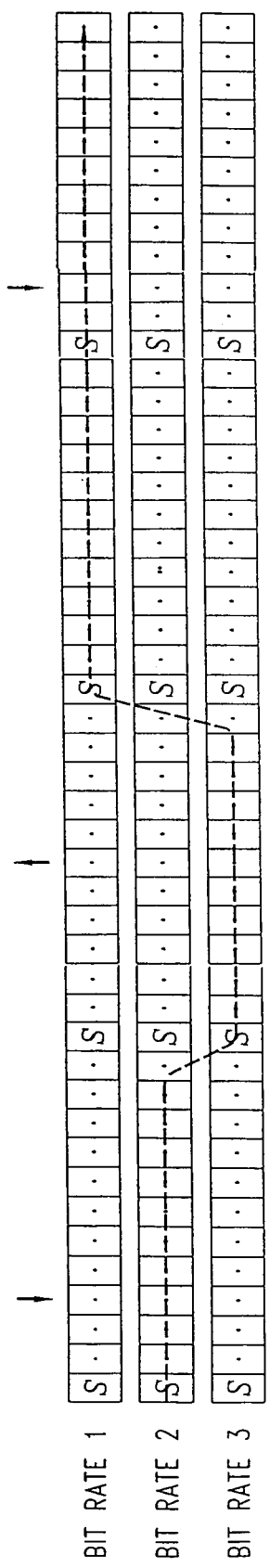
FIG. 1 shows a set of MBR encoded video streams having relatively infrequent switching points, and an example of a use thereof, generated and used in accordance with a first prior art MBR video encoding technique.

For example, FIG. 1 shows a set of MBR encoded video streams having relatively infrequent switching points, and an example of a use thereof, generated and used in accordance with a first prior art MBR video encoding technique. Each row represents a copy of an identical source video encoded at a different bit rate. The labeled S blocks are valid switching points—frames in which it is possible to start playback at a new bit rate. In other words, if frame f of a video is an S frame, then the video can either start on frame location f; or play from a video stream encoded at one bit rate until frame location f-1 is reached, and then continue playback at frame location f from a video stream encoded at a different bit rate. In an H.264 compliant encoder (a common MBR codec familiar to those of ordinary skill in the art), for example, the S frame may, for example, be an intra-coded (I) frame, as described above and fully familiar to those of ordinary skill in the art. (Note that H.264 encoders also make use of "slices", which are logical partitions of frames. The term "frame", as used herein, may illustratively refer to either frames or slices.) It can be seen in FIG. 1 that, illustratively, all sequences have S frames which are advantageously aligned at the same video frame locations.

As is well known to those of ordinary skill in the art, the S frames require significantly more bits to encode than alternative types of frames (which are unlabeled in FIG. 1 and the other instant figures), which we will refer to herein as N (non-switching) frames. In H.264 encoders, N frames typically include both P (predicted) and B (bi-directionally predicted) frame types, each of which is fully familiar to those of ordinary skill in the art. For mobile networks in particular, however, this requires an unfortunate trade-off. The available bandwidth on a wireless channel fluctuates rapidly, so there is a quality advantage which could be gained by switching bit rates frequently—perhaps as frequently as every frame.

Figure 2:
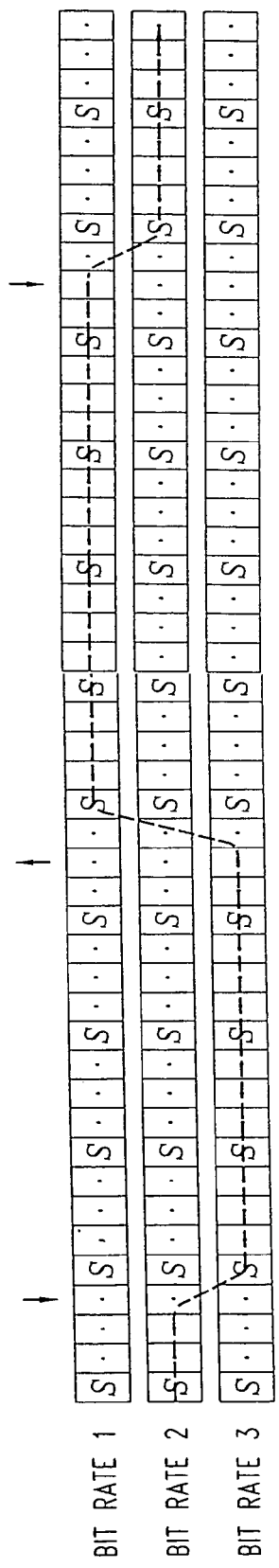
FIG. 2 shows a set of MBR encoded video streams having relatively frequent switching points, and an example of a use thereof, generated and used in accordance with a second prior art MBR video encoding technique.

FIG. 2 shows a set of MBR encoded video streams having relatively frequent switching points, and an example of a use thereof, generated and used in accordance with a second prior art MBR video encoding technique. In comparison to the prior art set of MBR encoded video streams shown in FIG. 1, the switching points in this figure are more frequent. Thus, the system can advantageously switch as frequently as every fourth frame. However, the less efficient (and frequent) S frames substantially lower the quality of the video relative to those having the identical bit rates but with less frequent switching points, such as those shown in FIG. 1.

More particularly, a MBR encoding such as that shown in FIG. 2 allows for a more rapid reaction to a bit rate change request. However, such a sequence, or, taken to the extreme—a sequence entirely composed of S frames, for example—would yield a very low quality decoded video signal for a given bit rate, since S frames are inherently less efficiently represented than N frames (and substantially so). This would undercut the goal of switching frequently to increase the quality of the video the user sees (since an N frame in a high bit rate sequence requires far fewer bits than an S frame at a lower overall rate). Spacing the S frames farther apart as in FIG. 1 on the other hand, makes the encoding more efficient, and delivers much better quality for a given bit rate. However, if a wireless channel is unable to support a selected bit rate, the wait to switch to another encoding (at another bit rate) at a subsequent S frame may be too long, and, thus, the frames may not be correctly delivered, thereby resulting in severe distortions in the playback. (Most prior art algorithms attempt to balance this inherent trade-off by tuning the S frame rate, conservatively accepting lower quality for a selected bit-rate, and accepting the lower quality.)

Note that all of the prior art solutions described above provide only a single encoding for each target rate. In accordance with the principles of the present invention, however, multiple encodings at a given bit rate are advantageously provided, thereby creating the flexibility to have "the best of both worlds", as compared to the approaches of the prior art techniques.

Figure 3:
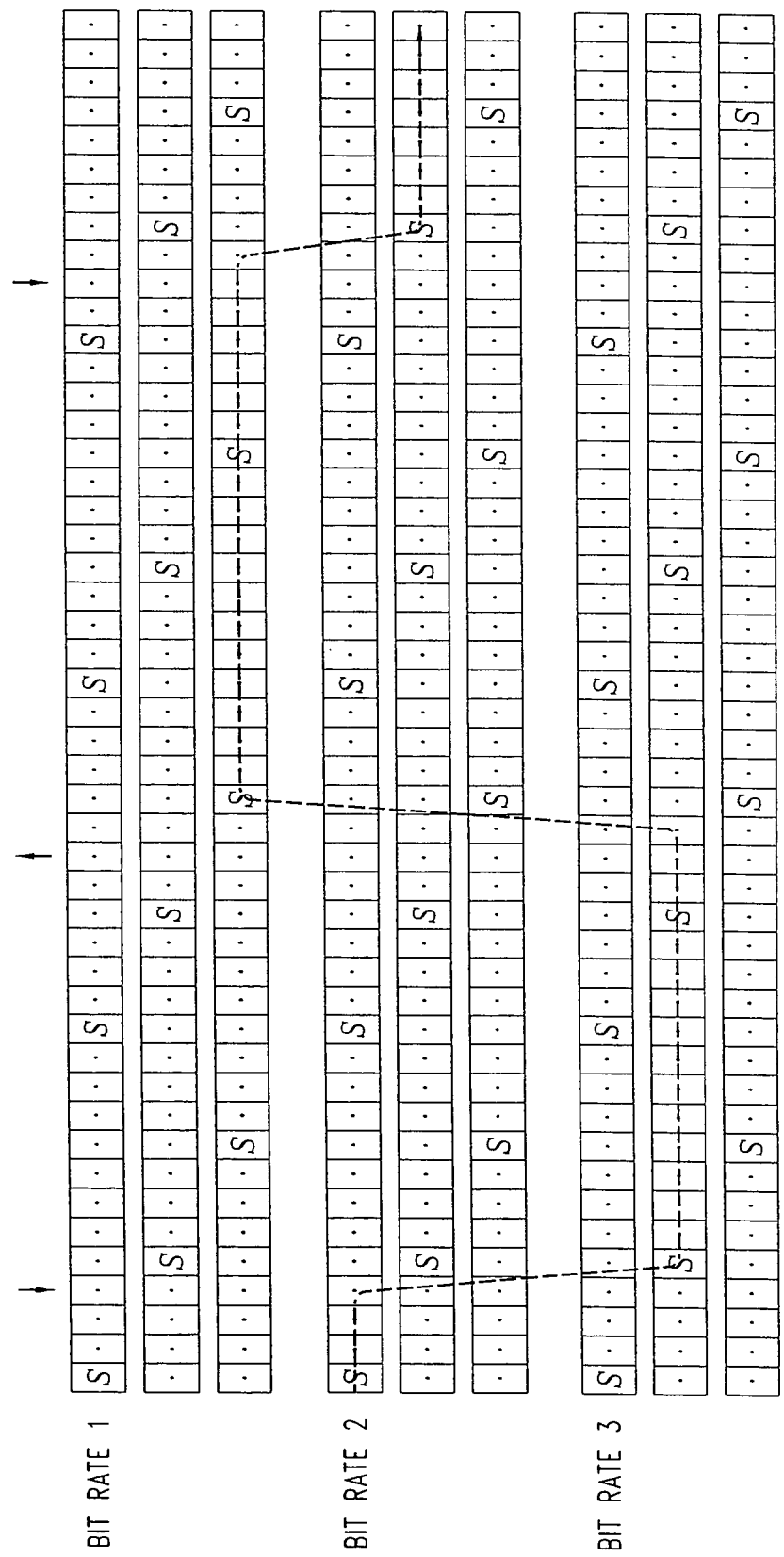
FIG. 3 shows a set of MBR encoded video streams, and an example of a use thereof, generated in accordance with a first illustrative embodiment of the present invention.

FIG. 3 shows a set of MBR encoded video streams, and an example of a use thereof, generated in accordance with a first illustrative embodiment of the present invention. In accordance with the principles of the present invention, the illustrative set of MBR encoded video streams shown in FIG. 3 advantageously employs a plurality of copies of the encoded video at each of the targeted bit rates. The set of MBR encoded video streams shown in FIG. 3 advantageously achieves the quality of the prior art approach of FIG. 1, since the S frames in any given copy are, illustratively, 12 frames apart (as they are in the encodings shown in FIG. 1). The set of MBR encoded video streams shown in FIG. 3 also advantageously achieves the switching frequency of the prior art approach of FIG. 2, since at any point there is an S frame available at any given bit rate within, illustratively, the next 4 frames (as there are in the encodings shown in FIG. 2). As can be seen from the figures, the switching between bit rates illustratively and advantageously occurs at identical frame locations in both FIG. 2 and FIG. 3. (Note that this is true for all possible change request patterns applied to the set of MBR encoded video streams shown in FIG. 3 versus those shown in FIG. 2.)

In sum, in accordance with the principles of the present invention, it is possible to achieve the higher quality of, for example, the prior art approach of FIG. 1, but with the higher switching rate of, for example, the prior art approach of FIG. 2. Clearly, the cost of this "best of both worlds" scenario is the additional storage which is used to provide a plurality of copies of the encoded video at each of the targeted bit rates. However, note that this cost may be quite acceptable since it is relatively low in comparison to the cost of limited bandwidth, particularly over-the-air bandwidth. Specifically, then, as shown in FIG. 3, for each bit rate there are multiple streams with S frames advantageously staggered. Thus, when a bit rate change is requested, the system can advantageously switch as fast as in the prior art approach of FIG. 2, to a stream having the same quality as in the prior art approach of FIG. 1.

Figure 4:
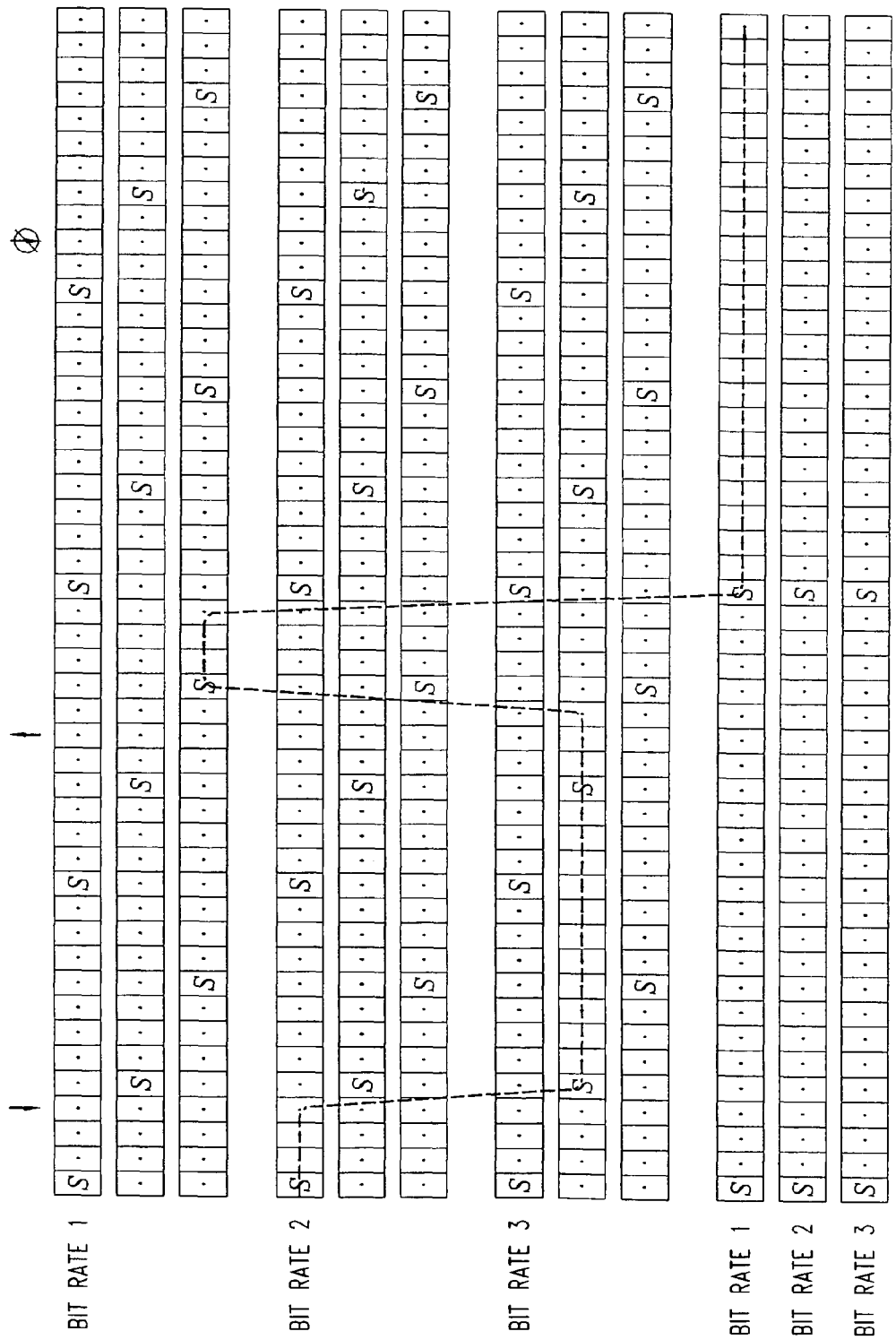
FIG. 4 shows a set of MBR encoded video streams, and an example of a use thereof, generated in accordance with a second illustrative embodiment of the present invention.

FIG. 4 shows a set of MBR encoded video streams, and an example of a use thereof, generated in accordance with a second illustrative embodiment of the present invention. Note that the first 3 sets of encoded video streams shown in FIG. 4—that is, the top 3 sets of 3 encoded video streams per set, each encoded at bit rate 1, bit rate 2 and bit rate 3, respectively—are identical to the 3 sets of encoded video streams shown in FIG. 3. However, in accordance with the second illustrative embodiment of the present invention shown in FIG. 4, an additional (fourth) set of encoded video streams is advantageously provided as well—namely, a set of encoded video streams at each of the three different bit rates (i.e., bit rate 1, bit rate 2 and bit rate 3) wherein the video signal was advantageously encoded at each of these bit rates with high quality—for example, without forcing a periodic S frame every so many blocks, or, alternatively, by providing only a minimal number of such "forced" S frames. In other words, each of the encoded video streams in this fourth set of encoded video streams may, for example, have S frames inserted only when they are, in fact, more efficient than N frames (i.e., non-switching frames) would have been. Note that this situation tends to typically occur at scene transitions when there is little correlation between the image of the given current frame and that of any previously encoded frame. (Note that typically, but not always, such transitional frames are also intra-coded—as opposed to inter-coded—in prior art encoding techniques, and thus they become an S frame even if there had been a recently forced periodic S frame, since these frames would tend to be poorly coded otherwise.)

Note also that under almost all circumstances, the S frame to N frame ratio will be very low when no periodic S frames are forced for purposes of MBR video encoding. Occasionally, S frames may be inserted by a video encoder in order to prevent small errors from accumulating at the decoder (the so-called "drift" problem, familiar to those of ordinary skill in the art), but the rate of such inserted S frames for this purpose is typically much less than the rate of the periodic S frames forced by a typical prior art MBR encoder for purposes of frequent rate switching over a wireless channel. (Note, by the way, that the actual ratio of S to N frames in "real-world" encoded video streams will normally be much lower than the illustrative ratio shown in any of the instant figures. Many more S frames than would normally be employed have been shown in the instant figures for ease of illustration—both in the illustrations of prior art MBR video encoding techniques as well as in the illustrations of the described illustrative embodiments of the present invention.)

Note again that the combined set of video streams provided in accordance with the illustrative embodiment of the present invention shown in FIG. 4 advantageously provides the substantial quality advantage of the highest bit rate video in the prior art approach shown in FIG. 1 (as compared, for example, to that of the prior art approach shown in FIG. 2), while providing the frequent switching ability advantage provided in the prior art approach shown in FIG. 2 (as compared, for example, to that of the prior art approach shown in FIG. 1). However, since the fourth set of encoded video streams of FIG. 4 do not require such frequent updates in the S frame rate, they will clearly provide a considerably higher quality for a given bit rate even as compared to the encoded video streams of FIG. 1. For example, if an encoded video stream from the fourth set of video streams of FIG. 4 were encoded at 1 Mbps, for example, they might actually be equivalent in quality to one of the encoded video streams of FIG. 1 encoded at 2 Mbps, for example. The reason is that S frames, no matter how efficiently coded, will always be less efficient than N frames. As such, in typical prior art MBR encoding techniques, this has created a seemingly contradictory situation—namely, in order to maintain high quality, the system is frequently switching between encoded video streams that are far less efficient in bandwidth utilization, and therefore, in fact, lower in quality. Paradoxically, in many cases, merely continuing to use a lower bit rate and not switching to a higher bit rate might actually yield better overall quality. In other words, if one had the option of not having periodically forced S frames every, say, n frames, one would not need to dedicate as large a number of bits to every nth frame merely to allow for switching. In accordance with the illustrative embodiment of the present invention shown in FIG. 4, however, higher quality is advantageously provided at a lower bit rate.

In summary, the fourth set of encoded video streams shown in FIG. 4 are "non-periodic" encodings which have S frames placed infrequently—for example, only when they are motivated by the source video (such as scene transitions), and thus, the total number of such S frames will be small. In operation of an MBR decoder system in accordance with the illustrative embodiment of the present invention shown in FIG. 4 therefore, the system advantageously will switch to one of these non-periodic (and high quality) encoded video stream whenever possible. (See description of FIG. 5 below.) Note that, advantageously, transitions out of these non-periodic encodings (e.g., to an encoding at a different bit rate) can occur with the same frequency as before (e.g., as in the illustrative embodiment shown in FIG. 3). For a fixed bit rate, these non-periodic encodings will be of a higher quality than corresponding ones with periodic switching points (since N frames are invariably smaller than S frames).

Figure 5:
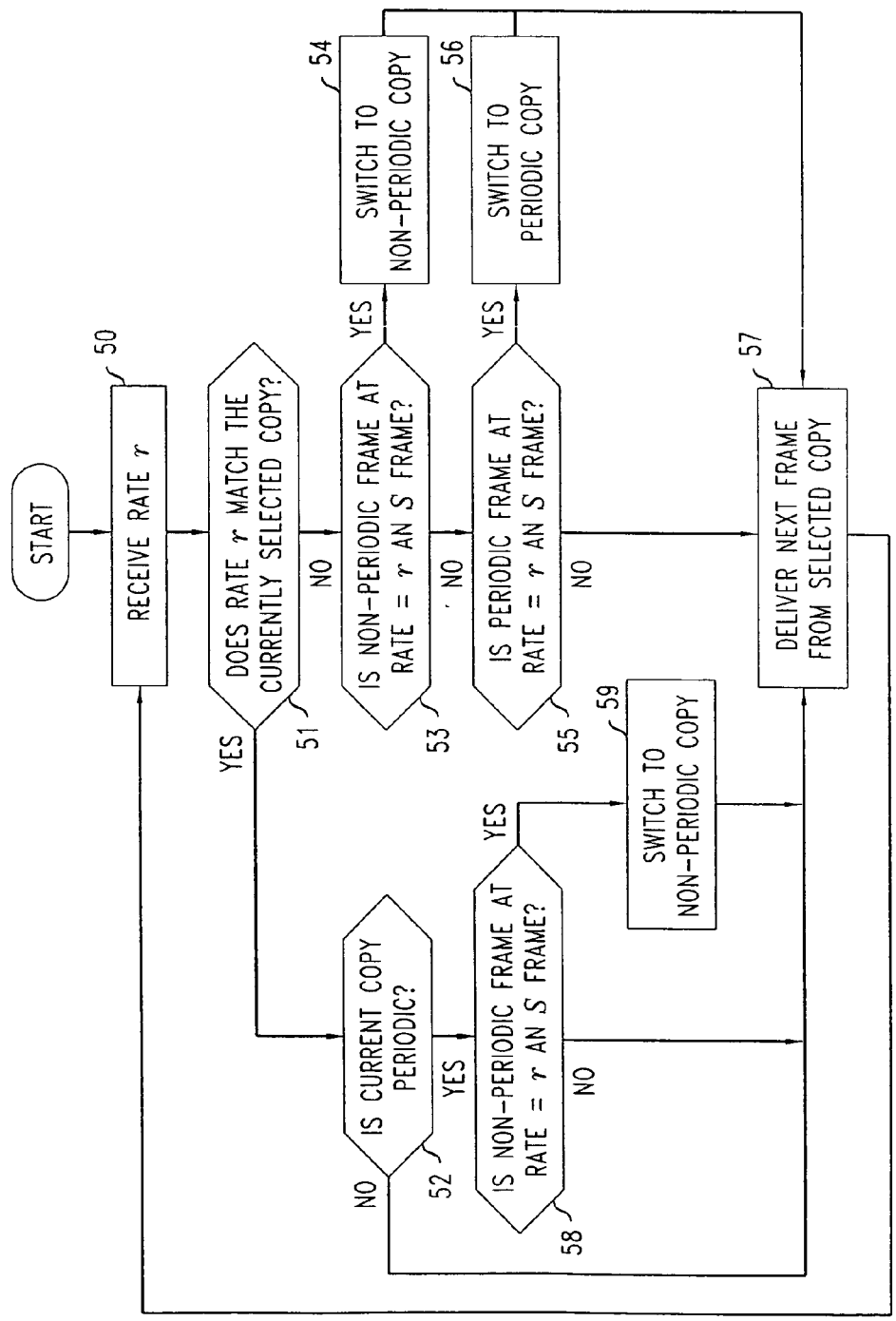
FIG. 5 shows a flowchart of an illustrative video stream switching algorithm, which may, for example, be applied to the set of MBR encoded video streams of FIG. 4, in accordance with an illustrative embodiment of the present invention.

FIG. 5 shows a flowchart of an illustrative video stream switching algorithm, which may, for example, be applied to the set of MBR encoded video streams of FIG. 4, in accordance with an illustrative embodiment of the present invention. The illustrative flowchart shows an iterative procedure that selects each frame to be delivered (e.g., to a video decoder) from one of the plurality of multiple encoded video streams provided. In addition to the plurality of encoded video streams, it is assumed that, for each frame, a requested bit rate is provided. In particular, some mechanism observing the communications channel requests a target bit rate r, as is conventional in MBR video encoding systems (including prior art MBR video systems).

Specifically, the flowchart begins a given iteration (to get the next video frame) by receiving the currently requested bit rate r in block 50. Then, in block 51, it is determined whether the rate r matches the rate of the currently selected copy. If so, block 52 determines whether the currently selected copy is periodic. If not, then block 57 delivers the next frame from the (currently) selected copy, since it will always be preferable to continue to use the non-periodic copy, if possible, since it is likely to be of a higher quality than any periodic copies which have been encoded at the same bit rate.

If, on the other hand, it is determined in block 52 that the currently selected copy is periodic, block 58 determines whether the current frame of the non-periodic copy at rate r happens to be an S frame, since it would be advantageous to switch to the non-periodic copy if possible. If block 58 determines that the current frame of the non-periodic copy at rate r is an S frame, block 59 switches to the non-periodic copy (at rate r) and then block 57 delivers the frame from this (newly selected) copy.

If, however, block 51 determines that the requested rate r does not match the rate of the currently selected copy, block 53 determines whether the current frame of the non-periodic copy at the requested rate r happens to be an S frame. If so, block 54 switches to the non-periodic copy at rate r and then, block 57 delivers the frame from this (newly selected) copy. If, on the other hand, block 53 determines that the current frame of the non-periodic copy is not an S frame, block 55 determines whether the current frame of any one of the periodic copies encoded at the requested rate r happens to be an S frame. If so, block 56 switches to that copy and then, block 57 delivers the frame from this (newly selected) copy.

If neither the current frame of the non-periodic copy at the requested rate r happens to be an S frame (as determined by block 53), nor the current frame of any of the periodic copies at the requested rate r happens to be an S frame (as determined by block 55), then block 57 delivers the next frame from the currently selected copy, even though the currently selected copy does not match the requested rate r. This is done since a frame must be delivered and there is no opportunity to switch (i.e., no S frame) to any of the copies which have been encoded at the currently requested rate r. Thus, the illustrative system of FIG. 5 will, in this case, stay with whatever copy it had been using. Of course, such a condition will last only until one of the copies at the requested rate encounters an S frame, which, in accordance with the principles of the present invention, should not be too long.

Note that the illustrative system of FIG. 5 will advantageously only switch at switch point frames, regardless of the requested bit rate, and that the system may further advantageously switch even when the requested bit rate is constant when a more efficient copy (e.g., the non-periodic copy) is available. Note also that if the illustrative system requests changes between available switch points, it may be assumed that those can be ignored, in that when a switch point becomes available, the best decision at that time will be to switch to a copy having the rate which is then being requested.

Finally, note that the illustrative system of FIG. 5 can advantageously switch at least as frequently as the S frame rate in the sets of periodic copies. Thus, it maintains the full flexibility of prior art systems with the added advantages described herein. Also the illustrative system of FIG. 5 will often gain the bit rate advantages of the non-periodic bit streams. The cost is in additional encoding and storage, although it may be reasonably assumed that for many video applications the cost of storage and additional encoding is minimal, and that the focus is on higher quality video at lower delivered bandwidth. In mobile video deployments, for example, this is clearly the case today, and moreover, storage prices are expected to continue their substantial decline year-over-year into the foreseeable future.

ADDENDUM TO THE DETAILED DESCRIPTION

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

What is claimed is:

1. A method for generating a plurality of encoded video streams, by an encoder, for use in a multiple bit rate video codec, each of said encoded video streams comprising corresponding sequences of encoded frames, the method comprising the steps of:
   generating a first encoded video stream at a first bit rate, the first encoded video stream at the first bit rate comprising a plurality of switching frames distributed throughout the first encoded video stream at a first set of encoded frame locations thereof;
   generating a second encoded video stream at the first bit rate, the second encoded video stream at the first bit rate comprising a plurality of switching frames distributed throughout the second encoded video stream at a second set of encoded frame locations thereof, wherein said first set of encoded frame locations differs substantially from said second set of encoded frame locations; and
   generating one or more encoded video streams at each of one or more bit rates different from the first bit rate.

2. The method of claim 1 wherein said step of generating one or more encoded video streams at each of one or more bit rates different from the first bit rate comprises at least: generating a third encoded video stream at a second bit rate, the third encoded video stream at the second bit rate comprising a plurality of switching frames distributed throughout the third encoded video stream at a third set of encoded frame locations thereof; and generating a fourth encoded video stream at the second bit rate, the fourth encoded video stream at the second bit rate comprising a plurality of switching frames distributed throughout the fourth encoded video stream at a fourth set of encoded frame locations thereof, wherein said third set of encoded frame locations differs substantially from said fourth set of encoded frame locations, wherein said second set of encoded frame locations is substantially the same as said fourth set of encoded frame locations.

3. The method of claim 2 wherein said first set of encoded frame locations is substantially the same as said third set of encoded frame locations and wherein said second set of encoded frame locations is substantially the same as said fourth set of encoded frame locations.

4. The method of claim 1 wherein the first set of encoded frame locations and the second set of encoded frame locations are of substantially the same size, and wherein each comprises a periodic set of frame locations having a substantially constant number of frame locations between each frame location in said set which are not switching frames, and wherein the first set of encoded frame locations and the second set of encoded frame locations are shifted with respect to each other by a number of frame locations less than, said substantially constant number of frame locations.

5. The method of claim 4 further comprising the step of generating a fifth encoded video stream at the first bit rate, the fifth encoded video stream being of higher quality than the first encoded video stream and the second encoded video stream and comprising a number of switching frames distributed throughout the fifth encoded video stream at a fifth set of encoded frame locations thereof, wherein the fifth set of encoded frame locations is substantially smaller in size than the first set of encoded frame locations and the second set of encoded frame locations.

6. The method of claim 5 further comprising the step of generating a sixth encoded video stream at the second bit rate, the sixth encoded video stream being of higher quality than the third encoded video stream and the fourth encoded video stream and comprising a number of switching frames distributed throughout the sixth encoded video stream at a sixth set of encoded frame locations thereof, wherein the sixth set of encoded frame locations is substantially smaller in size than the third set of encoded frame locations and the fourth set of encoded frame locations.

7. A method for using a plurality of encoded video streams in a multiple bit rate video codec, the plurality of encoded video streams comprising a first encoded video stream at a first bit rate, the first encoded video stream at the first bit rate comprising a plurality of switching frames distributed throughout the first encoded video stream at a first set of encoded frame locations thereof, a second encoded video stream at the first bit rate, the second encoded video stream at the first bit rate comprising a plurality of switching frames distributed throughout the second encoded video stream at a second set of encoded frame locations thereof, wherein said first set of encoded frame locations differs substantially from said second set of encoded frame locations, and one or more encoded video streams at each of one or more bit rates different from the first bit rate, the method comprising the steps of: receiving a target bit rate for a given next frame to be decoded; and if said target bit rate is equal to the first bit rate, delivering the given next frame to a decoder from one of either the first encoded video stream or the second encoded video stream based on the encoded frame locations of said switching frames comprised in said first encoded video stream and the encoded frame locations of said switching frames comprised in said second encoded video stream.

8. The method of claim 7 wherein the plurality of encoded video streams further comprise a third encoded video stream at a second bit rate, the third encoded video stream at the second bit rate comprising a plurality of switching frames distributed throughout the third encoded video stream at a third set of encoded frame locations thereof, and a fourth encoded video stream at the second bit rate, the fourth encoded video stream at the second bit rate comprising a plurality of switching frames distributed throughout the fourth encoded video stream at a fourth set of encoded frame locations thereof, wherein said third set of encoded frame locations differs substantially from said fourth set of encoded frame locations, wherein said second set of encoded frame locations is substantially the same as said fourth set of encoded frame locations, and wherein the method further comprises the step of: if said target bit rate is equal to the second bit rate, delivering the given next frame to a decoder from one of either the third encoded video stream or the fourth encoded video stream based on the encoded frame locations of said switching frames comprised in said third encoded video stream and the encoded frame locations of said switching frames comprised in said fourth encoded video stream.

9. The method of claim 8 wherein said first set of encoded frame locations is substantially the same as said third set of encoded frame locations and wherein said second set of encoded frame locations is substantially the same as said fourth set of encoded frame locations.

10. The method of claim 7 wherein the first set of encoded frame locations and the second set of encoded frame locations are of substantially the same size, and wherein each comprises a periodic set of frame locations having a substantially constant number of frame locations between each frame location in said set which are not switching frames, and wherein the first set of encoded frame locations and the second set of encoded frame locations are shifted with respect to each other by a number of frame locations less than said substantially constant number of frame locations.

11. The method of claim 10 wherein the plurality of encoded video streams further comprises a fifth encoded video stream at the first bit rate, the fifth encoded video stream being of higher quality than the first encoded video stream and the second encoded video stream and comprising a number of switching frames distributed throughout the fifth encoded video stream at a fifth set of encoded frame locations thereof, wherein the fifth set of encoded frame locations is substantially smaller in size than the first set of encoded frame locations and the second set of encoded frame locations, and wherein the step of delivering the given next frame to a decoder if said target bit rate is equal to the first bit rate comprises delivering the given next frame from the fifth encoded video stream based on the encoded frame locations of said switching frames comprised in said fifth encoded video stream, and delivering the given next frame from the first or second encoded video stream only if the given next frame is not delivered from the fifth encoded video stream.

12. The method of claim 11 wherein the plurality of encoded video streams further comprises a sixth encoded video stream at the second bit rate, the sixth encoded video stream being of higher quality than the third encoded video stream and the fourth encoded video stream and comprising a number of switching frames distributed throughout the sixth encoded video stream at a sixth set of encoded frame locations thereof, wherein the sixth set of encoded frame locations is substantially smaller in size than the third set of encoded frame locations and the fourth set of encoded frame locations, and wherein the step of delivering the given next frame to a decoder if said target bit rate is equal to the second bit rate comprises delivering the given next frame from the sixth encoded video stream based on the encoded frame locations of said switching frames comprised in said sixth encoded video stream, and delivering the given next frame from the third or fourth encoded video stream only if the given next frame is not delivered from the sixth encoded video stream.

13. A multiple bit rate encoder system for generating a plurality of encoded video streams, each of said encoded video streams comprising corresponding sequences of encoded frames, the multiple bit rate encoder system comprising an encoder which is adapted to: generate a first encoded video stream at a first bit rate, the first encoded video stream at the first bit rate comprising a plurality of switching frames distributed throughout the first encoded video stream at a first set of encoded frame locations thereof; generate a second encoded video stream at the first bit rate, the second encoded video stream at the first bit rate comprising a plurality of switching frames distributed throughout the second encoded video stream at a second set of encoded frame locations thereof, wherein said first set of encoded frame locations differs substantially from said second set of encoded frame locations; and generate one or more encoded video streams at each of one or more bit rates different from the first bit rate.

14. The multiple bit rate encoder system of claim 13 wherein the generation of the one or more encoded video streams at each of one or more bit rates different from the first bit rate comprises at least: generating a third encoded video stream at a second bit rate, the third encoded video stream at the second bit rate comprising a plurality of switching frames distributed throughout the third encoded video stream at a third set of encoded frame locations thereof; and generating a fourth encoded video stream at the second bit rate, the fourth encoded video stream at the second bit rate comprising a plurality of switching frames distributed throughout the fourth encoded video stream at a fourth set of encoded frame locations thereof, wherein said third set of encoded frame locations differs substantially from said fourth set of encoded frame locations, wherein said second set of encoded frame locations is substantially the same as said fourth set of encoded frame locations.

15. The multiple bit rate encoder system of claim 14 wherein said first set of encoded frame locations is substantially the same as said third set of encoded frame locations and wherein said second set of encoded frame locations is substantially the same as said fourth set of encoded frame locations.

16. The multiple bit rate encoder system of claim 13 wherein the first set of encoded frame locations and the second set of encoded frame locations are of substantially the same size, and wherein each comprises a periodic set of frame locations having a substantially constant number of frame locations between each frame location in said set which are not switching frames, and wherein the first set of encoded frame locations and the second set of encoded frame locations are shifted with respect to each other by a number of frame locations less than said substantially constant number of frame locations.

17. The multiple bit rate encoder system of claim 16 wherein the encoder is further adapted to generate a fifth encoded video stream at the first bit rate, the fifth encoded video stream being of higher quality than the first encoded video stream and the second encoded video stream and comprising a number of switching frames distributed throughout the fifth encoded video stream at a fifth set of encoded frame locations thereof, wherein the fifth set of encoded frame locations is substantially smaller in size than the first set of encoded frame locations and the second set of encoded frame locations.

18. The multiple bit rate encoder system of claim 17 wherein the encoder is further adapted to generate a sixth encoded video stream at the second bit rate, the sixth encoded video stream being of higher quality than the third encoded video stream and the fourth encoded video stream and comprising a number of switching frames distributed throughout the sixth encoded video stream at a sixth set of encoded frame locations thereof, wherein the sixth set of encoded frame locations is substantially smaller in size than the third set of encoded frame locations and the fourth set of encoded frame locations.

19. A multiple bit rate system which operates on a plurality of encoded video streams, the plurality of encoded video streams comprising a first encoded video stream at a first bit rate, the first encoded video stream at the first bit rate comprising a plurality of switching frames distributed throughout the first encoded video stream at a first set of encoded frame locations thereof, a second encoded video stream at the first bit rate, the second encoded video stream at the first bit rate comprising a plurality of switching frames distributed throughout the second encoded video stream at a second set of encoded frame locations thereof, wherein said first set of encoded frame locations differs substantially from said second set of encoded frame locations, and one or more encoded video streams at each of one or more bit rates different from the first bit rate, the multiple bit rate system comprising:
  means for receiving a target bit rate for a given next frame to be decoded; and
  means for delivering, if said target bit rate is equal to the first bit rate, the given next frame to a decoder from one of either the first encoded video stream or the second encoded video stream based on the encoded frame locations of said switching frames comprised in said first encoded video stream and the encoded frame locations of said switching frames comprised in said second encoded video stream.

20. The multiple bit rate system of claim 19 wherein the plurality of encoded video streams further comprise a third encoded video stream at a second bit rate, the third encoded video stream at the second bit rate comprising a plurality of switching frames distributed throughout the third encoded video stream at a third set of encoded frame locations thereof, and a fourth encoded video stream at the second bit rate, the fourth encoded video stream at the second bit rate comprising a plurality of switching frames distributed throughout the fourth encoded video stream at a fourth set of encoded frame locations thereof, wherein said third set of encoded frame locations differs substantially from said fourth set of encoded frame locations, wherein said second set of encoded frame locations is substantially the same as said fourth set of encoded frame locations, and wherein the multiple bit rate system further comprises: means for delivering, if said target bit rate is equal to the second bit rate, the given next frame to the decoder from one of either the third encoded video stream or the fourth encoded video stream based on the encoded frame locations of said switching frames comprised in said third encoded video stream and the encoded frame locations of said switching frames comprised in said fourth encoded video stream.

21. The multiple bit rate system of claim 20 wherein said first set of encoded frame locations is substantially the same as said third set of encoded frame locations and wherein said second set of encoded frame locations is substantially the same as said fourth set of encoded frame locations.

22. The multiple bit rate system of claim 19 wherein the first set of encoded frame locations and the second set of encoded frame locations are of substantially the same size, and wherein each comprises a periodic set of frame locations having a substantially constant number of frame locations between each frame location in said set which are not switching frames, and wherein the first set of encoded frame locations and the second set of encoded frame locations are shifted with respect to each other by a number of frame locations less than said substantially constant number of frame locations.

23. The multiple bit rate system of claim 22 wherein the plurality of encoded video streams further comprises a fifth encoded video stream at the first bit rate, the fifth encoded video stream being of higher quality than the first encoded video stream and the second encoded video stream and comprising a number of switching frames distributed throughout the fifth encoded video stream at a fifth set of encoded frame locations thereof, wherein the fifth set of encoded frame locations is substantially smaller in size than the first set of encoded frame locations and the second set of encoded frame locations, and wherein the means for delivering the given next frame to the decoder if said target bit rate is equal to the first bit rate delivers the given next frame from the fifth encoded video stream based on the encoded frame locations of said switching frames comprised in said fifth encoded video stream, and delivers the given next frame from the first or second encoded video stream only if the given next frame is not delivered from the fifth encoded video stream.

24. The multiple bit rate system of claim 23 wherein the plurality of encoded video streams further comprises a sixth encoded video stream at the second bit rate, the sixth encoded video stream being of higher quality than the third encoded video stream and the fourth encoded video stream and comprising a number of switching frames distributed throughout the sixth encoded video stream at a sixth set of encoded frame locations thereof, wherein the sixth set of encoded frame locations is substantially smaller in size than the third set of encoded frame locations and the fourth set of encoded frame locations, and wherein the means for delivering the given next frame to the decoder if said target bit rate is equal to the second bit rate delivers the given next frame from the sixth encoded video stream based on the encoded frame locations of said switching frames comprised in said sixth encoded video stream, and delivers the given next frame from the third or fourth encoded video stream only if the given next frame is not delivered from the sixth encoded video stream.

* * * * *